(12) United States Patent
Elferich et al.

(10) Patent No.: US 9,497,814 B2
(45) Date of Patent: Nov. 15, 2016

(54) DRIVER DEVICE AND DRIVING METHOD FOR DRIVING A LOAD, IN PARTICULAR AN LED UNIT

(75) Inventors: Reinhold Elferich, Aachen (DE); Toni Lopez, Kelmis (BE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 69 days.

(21) Appl. No.: 14/124,737

(22) PCT Filed: Jun. 4, 2012

(86) PCT No.: PCT/IB2012/052796
§ 371 (c)(1),
(2), (4) Date: Dec. 9, 2013

(87) PCT Pub. No.: WO2012/168847
PCT Pub. Date: Dec. 13, 2012

(65) Prior Publication Data
US 2014/0117867 A1    May 1, 2014

(30) Foreign Application Priority Data

Jun. 10, 2011    (EP) .................................... 11169523

(51) Int. Cl.
*H05B 33/08*    (2006.01)
*H02M 3/158*    (2006.01)

(52) U.S. Cl.
CPC ....... *H05B 33/0845* (2013.01); *H02M 3/1582* (2013.01); *H05B 33/0815* (2013.01); *Y02B 20/348* (2013.01)

(58) Field of Classification Search
CPC .................................................... H05B 37/02
See application file for complete search history.

(56) References Cited

U.S. PATENT DOCUMENTS 6,198,260 B1    3/2001    Wittenbreder
6,278,245 B1    8/2001    Li et al.
(Continued)

FOREIGN PATENT DOCUMENTS

CN    1588772    3/2005
EP    2202873 A1    6/2010
(Continued)

OTHER PUBLICATIONS

Ricardo De Oliveira Brioschi et al; "High-Power-Factor Electronic Ballast With Constant DC-Link Voltage", IEEE Transactions on Power Electronics, vol. 13, No. 6, 1998.
(Continued)

*Primary Examiner* — Hai L Nguyen (57) ABSTRACT

The present invention relates to a driver device ($50a$-$50j$) and a corresponding driving method for driving a load (22), in particular an LED unit, said driver device comprising power input terminals (51, 52) for receiving a rectified supply voltage from an external power supply, power output terminals (53, 54) for providing a drive voltage and/or current for driving a load (22), a half-bridge unit (70) comprising a first (60) and a second (61) switching element coupled in series between a high-voltage node (57) and a low-voltage node (58) and having a switch node (59) between said first and said second switching element, —a boost input filter unit (71) comprising a first inductor (L1) coupled between said power input terminals (51, 52) and said half-bridge unit (70), —a buck output filter unit (72) comprising a second inductor (L2) coupled between said half-bridge unit (70) and a power output terminal (53, 54), —an energy storage unit (73) and a control unit (64) for controlling said switching elements (60, 61).

14 Claims, 12 Drawing Sheets (56) References Cited

U.S. PATENT DOCUMENTS

| | | | |
|---|---|---|---|
| 8,686,667 B2 * | 4/2014 | Mishima et al. | 315/307 |
| 8,766,549 B2 * | 7/2014 | Hirsch | H01J 61/125 |
| | | | 315/200 R |
| 2006/0103363 A1 | 5/2006 | Miftakhutdinov | |
| 2010/0296324 A1 | 11/2010 | Boeke | |

FOREIGN PATENT DOCUMENTS

| | | |
|---|---|---|
| JP | 2009526365 A | 7/2009 |
| JP | 2010063299 A | 3/2010 |
| WO | 03022015 A1 | 3/2003 |
| WO | 2009040691 A2 | 4/2009 |

OTHER PUBLICATIONS

Robert Erickson et al; "Design of a Simple High-Power-Factor Rectifier Based on the Flyback Converter", IEEE Proceedings of the Applied Power Electronics Conferences and Expositions, 1990, pp. 792-801.

\* cited by examiner

DRIVER DEVICE AND DRIVING METHOD FOR DRIVING A LOAD, IN PARTICULAR AN LED UNIT

FIELD OF THE INVENTION

The present invention relates to a driver device and a corresponding driving method for driving a load, in particular an LED unit comprising one or more LEDs. Further, the present invention relates to a light apparatus.

BACKGROUND OF THE INVENTION

In the field of LED drivers for offline applications such as retrofit lamps, solutions are demanded to cope with requirements relating to high efficiency, high power density, long lifetime, high power factor and low cost, among other relevant features. While practically all existing solutions compromise one or the other requirement, it is essential that the proposed driver circuits properly condition the form of the mains power into the form required by the LEDs, while keeping compliance with present and future power mains regulations. It is of critical importance to guarantee a maximum with respect to perceptible light flicker (preferably zero) at the same time that the power factor is maintained above a certain limit.

Typically, two series-connected power stages are employed to obtain a high power factor while keeping the output power constant throughout a mains cycle (or supply cycle, i.e. the cycle of the mains voltage or the supply voltage). Also known are converters with a single power-converting stage that allow high power factors (HPF) by means of integrating a boost converter operating in discontinuous conduction mode. These converters actually combine two power conversion stages.

A HPF converter for compact fluorescent lamps is described in "High-Power-Factor Electronic Ballast with Constant DC-Link Voltage", by Ricardo de Oliveira Brioschi and José Luiz F. Vieira, IEEE Transactions on Power Electronics, vol. 13, no. 6, 1998. Here, a half-bridge unit is shared by a boost converter and an LC parallel resonant converter, which is operated above resonance in order to obtain zero voltage switching (ZVS). To further support ZVS, the bus voltage is controlled to be constant. Such a HPF converter, however, typically requires a large bus capacitor and an output rectifier and has only narrow supply voltage and load (drive) voltage ranges.

SUMMARY OF THE INVENTION

It is an object of the present invention to provide a driver device and a corresponding driving method, for driving a load, in particular an LED unit comprising one or more LEDs, and enabling particularly a high power factor, a virtually constant load, a small size, a high efficiency, a long lifetime and low costs to be achieved. Further, it is an object of the present invention to provide a corresponding light apparatus.

According to an aspect of the present invention, a driver device is provided comprising:
power input terminals for receiving a rectified supply voltage from an external power supply,
power output terminals for providing a drive voltage and/or current for driving a load,
a half-bridge unit comprising a first and a second switching element coupled in series between a high-voltage node and a low-voltage node and having a switch node between said first and said second switching element,
a boost input filter unit comprising a first inductor coupled between said power input terminals and said half-bridge unit,
a buck output filter unit comprising a second inductor coupled between said half-bridge unit and a power output terminal,
an energy storage unit, and
a control unit for controlling said switching elements.

According to another aspect of the present invention, a corresponding driving method is provided.

According to still another aspect of the present invention, a light apparatus is provided comprising a light assembly having one or more light units, in particular an LED unit comprising one or more LEDs, and a driver device for driving said light assembly as provided according to the present invention.

Preferred embodiments of the invention are defined in the dependent claims. It shall be understood that the claimed method has similar and/or identical preferred embodiments as the claimed device and as defined in the dependent claims.

The present invention is based on the idea to integrate an offline synchronous boost converter into a synchronous buck converter. A load (e.g. a HV LED unit) is connected to the power output terminals. Further, a HF filter capacitor (i.e. a mains filter) is preferably connected to the power input terminals. In this way, the present invention provides both a constant drive current and power factors of 0.9 or higher.

The separate capacitor voltage level (i.e. the level of the voltage across the power storage unit, which is preferably a capacitor; also called "bus capacitor" hereinafter) allows minimizing the stored energy. The buck current provides for lossless switching of both switching elements (preferably transistors, e.g. MOSFETS, said switching elements forming a half-bridge unit), which means high efficiency even at high frequencies, which allows for miniaturized inductors.

Compared to the known HPF converter, a large bus capacitor can be dispensed with by allowing the bus voltage (i.e. the voltage across the energy storage unit) to vary during the supply cycle or a mains voltage cycle (e.g. by 20 to 80%) while keeping the output (drive) current constant. Further, the output rectifier is omitted because the LC stage is replaced by a step down converter stage (i.e. a buck converter). Still further, narrow supply and drive voltage ranges can be overcome by a variation of the circuit and by dedicated half-bridge control. This makes it possible to design the invention for US mains and for European mains, while still keeping the voltage stress of the half-bridge unit and energy storage element (e.g. storage capacitor) within typical limits.

According to the present invention, there are various basic configurations of the boost integrated synchronous buck converter (BSB), which are provided as different preferred embodiments that can cope with various load and input voltage ranges. All of them can be controlled over full load range down to virtually zero load current by means of manipulating the duty cycle only or the switching frequency or by burst mode operation.

The supply voltage may be a rectified periodic supply voltage provided by a power supply. In the case that an AC mains voltage is provided as input voltage to the power supply (or the power input terminals), e.g. from a mains voltage supply, a rectifier unit is preferably used (as part of the driver device or as an external unit coupled to the power input terminals) for rectifying the provided AC input voltage, e.g. a mains voltage, to the (rectified periodic) supply voltage. Such a rectifier unit may, for instance, comprise a generally known half-bridge or full-bridge rectifier. The supply voltage thus has the same polarity for either polarity of the AC input voltage.

Alternatively, if e.g. such a rectified periodic supply voltage is already provided at the power input terminals, e.g. from a rectifier (representing said external power supply) provided elsewhere, no further, or only general, elements (like e.g. an amplifier) are coupled to the power input terminals for shaping the provided supply voltage.

There are various embodiments of the proposed driver device which differ mainly by the way in which the various elements of the driver device are coupled.

The output side of the boost input filter unit can be coupled to the first or the second switching element of the half-bridge unit. Preferably, if the output terminals of the boost input filter unit are toggled, i.e. differently coupled to the half-bridge unit, the input terminals of the buck output filter unit are also toggled, i.e. differently coupled to the half-bridge unit, in order to ensure self-stabilizing operation.

According to further embodiments, either the load (i.e. the power output terminals) or the energy storage unit, e.g. a bus capacitor, is connected to the output terminals of the buck output filter unit or the output terminals of the boost input filter unit. In another embodiment, the energy storage unit is coupled in series to the load.

The various embodiments are provided for use in different applications and at different voltages, and are directed towards achieving certain aims. Often, a trade-off has to be made to select the optimum embodiment.

Preferably, the switching elements together form a half-bridge unit (also called switching unit, or sometimes called half-bridge). But generally, the switching elements can be implemented in various ways, e.g. including transistors (e.g. MOSFETs) or other controlled switching means.

Advantageously, the energy storage unit comprises a charge capacitor, preferably a single capacitor.

In an embodiment, a second power input terminal and a second power output terminal are connected to a reference potential, in particular ground potential. In other embodiments, the first power input terminal and the first power output terminal are directly connected, while the second power input terminal and a second power output are not directly connected.

Preferably, the control unit is adapted for keeping the output current constant in order to keep the voltage across the energy storage element below a predetermined threshold and/or to shape the input current. Zero voltage switching of the switching elements is provided for by the design (components) of the proposed driver device. The tasks of the control are to keep the output current constant, possibly according to a reference current (set point), to keep the bus voltage (i.e. the voltage across the energy storage element) below a preset limit and/or to shape the input current.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
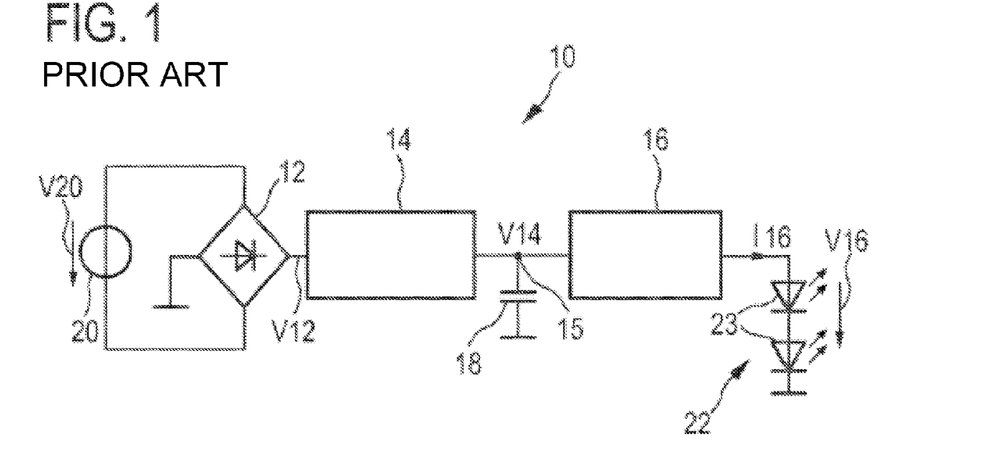
FIG. 1 shows a schematic block diagram of a known two-stage driver device.

An embodiment of a known two-stage driver device 10 is schematically shown in FIG. 1. Said driver device 10 comprises a rectifier unit 12, a first-stage preconditioning unit 14 coupled to the output of the rectifier unit 12, a second-stage conversion unit 16 coupled to the output of the first-stage preconditioning unit 14 and a charge capacitor 18 coupled to the node 15 between said first-stage preconditioning unit 14 and said second-stage conversion unit 16. The rectifier unit 12 preferably comprises a rectifier, such as a known full-wave or half-wave bridge rectifier, for rectifying a provided AC input voltage V20, e.g., from an external mains voltage supply 20, to a rectified voltage V12. The load 22 is, in this embodiment, an LED unit comprising two LEDs 23 coupled to the output of the second stage conversion unit 16 whose output signal, in particular its drive voltage V16 and its drive current 116, is used to drive the load 22.

The first-stage preconditioning unit 14 preconditions the rectified voltage V12 to an intermediate DC voltage V14, and the second-stage conversion unit 16 converts said intermediate DC voltage V14 to the desired DC drive voltage V16. The charge capacitor 18 is provided to store a charge, i.e. it is charged from the intermediate DC voltage V14, thereby filtering the low-frequency signal of the rectified voltage V12 to ensure a substantially constant output power of the second stage conversion unit 16, in particular a constant drive current 116 through the load 22. As these elements 14, 16, 18 are generally known and widely used in such driver devices 10, they will not be described in more detail here.

Generally, the driver device 10 complies with the aforementioned demand for a high power factor and low flicker at the expense of both larger space requirements and higher costs, which might be drastically limited however particularly in retrofit applications. The size of the first-stage preconditioning unit 14 may be mainly determined by the associated passive components, particularly if it comprises a switched mode power supply (SMPS), e.g. a boost converter, operating at a low or moderate switching frequency. Any attempt to increase the switching frequency so as to reduce the size of these filter components may yield a rapid increase in energy losses in the hard-switched SMPS and hence the need for larger heat sinks.

Figure 2A:
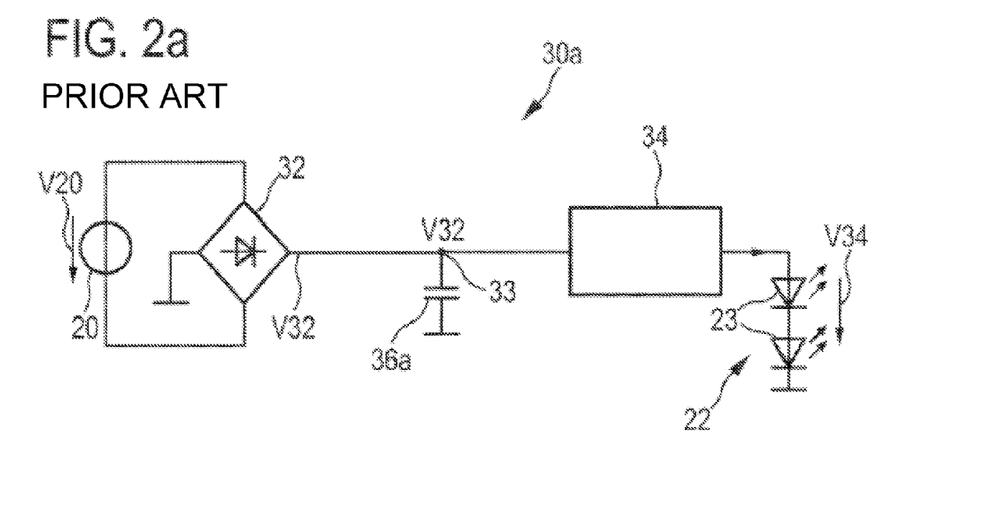
FIG. 2a shows a schematic block diagram of a known single-stage driver device with input storage capacitor.
Figure 2B:
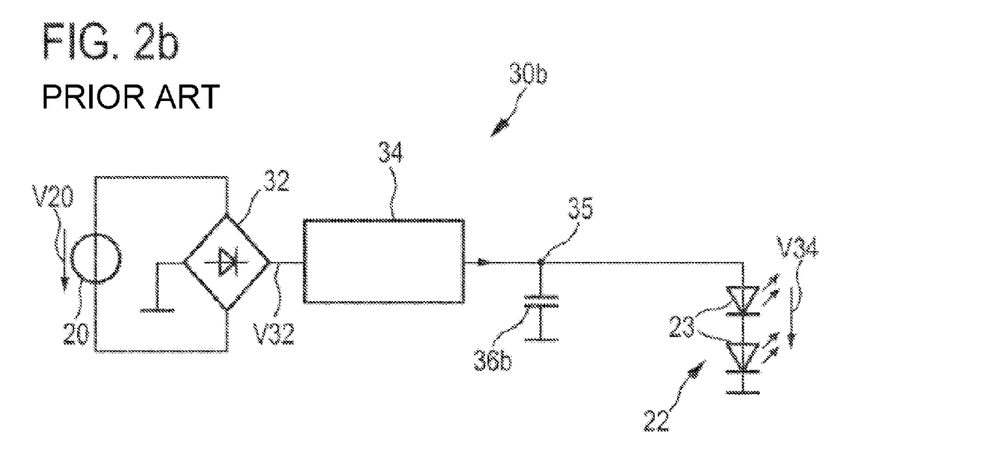
FIG. 2b shows a schematic block diagram of a known single-stage driver device with output storage capacitor.

Embodiments of known single-stage driver devices 30a, 30b are schematically shown in FIG. 2a and FIG. 2b. Said driver device 30 comprises a rectifier unit 32 (that may be identical to the rectifier unit 12 of the two-stage driver device 10 shown in FIG. 1) and a conversion unit 34 (e.g. flyback converter for the embodiment shown in FIG. 2b or a buck converter for the embodiment shown in FIG. 2a) coupled to the output of the rectifier unit 32. Further, in the embodiment shown in FIG. 2a, a charge capacitor 36a (representing a low-frequency input storage capacitor) is coupled to the node 33 between said rectifier unit 32 and said conversion unit 34. In the embodiment shown in FIG. 2b, the charge capacitor 36b (representing a low-frequency output storage capacitor) is coupled to the node 35 between said conversion unit 34 and the load 22. The rectifier unit rectifies an AC input voltage V20, provided, e.g., from an external mains voltage supply (also called power supply) 20, to a rectified voltage V32. The rectified voltage V32 is converted into the desired DC drive voltage V34 for driving the load 22.

The storage capacitors 18 (in FIG. 1) and 36a, 36b (in FIGS. 2a, 2b) are mainly provided to filter out the low-frequency component of the rectified voltage V12 in order to allow for a constant current into the load. Such capacitors are therefore large, particularly when placed in parallel with the load and when such a load is an LED.

Driver devices as shown in FIGS. 1 and 2 are, for instance, described in Robert Erickson and Michael Madigan, "Design of a simple high-power-factor rectifier based on the flyback converter", IEEE Proceedings of the Applied Power Electronics Conferences and Expositions, 1990, pp. 792-801.

Most of those single-stage driver devices 30a,b, although featuring a lower number of hardware components compared to two-stage driver devices as exemplarily shown in FIG. 1, generally cannot offer a high power factor and a low perceptible flicker simultaneously due to limitations in the size of the charge capacitor, which must filter out the low-frequency component of the AC input voltage. In addition, single-stage driver devices may critically compromise size, lifetime and maximum-temperature operation of the load (e.g. a lamp) due to the use of large storage capacitors to mitigate perceptible flicker.

FIGS. 3 to 5 depict several embodiments of three different basic configurations of a driver device according to the present invention. These three configurations (embodiments of configuration 1 being shown in FIG. 3, embodiments of configuration 2 being shown in FIG. 4, embodiments of configuration 3 being shown in FIG. 5) differ in operation in terms of the in- and output voltage ranges which they support, as well as in terms of component stress at peak voltages and RMS currents. All three configurations show self-stabilizing behaviour, which allows controlling the output current so as to be constant at a predetermined bus voltage (i.e. the voltage vbus) ripple as will be explained below. The boost inductor (i.e. the first inductor L1 of the boost input filter unit 71) is designed for operation in the discontinuous conduction mode. Further, ZVS is possible for both transitions of the switching elements (i.e. the switching elements 60, 61 forming a half-bridge unit), which is determined by the buck inductor (i.e. the second inductor L2 of the buck output filter unit 72).

In the embodiments of type 1 (i.e. the embodiments shown in FIGS. 3a, 4a, 5a) and of type 2 (i.e. the embodiments shown in FIGS. 3b, 4b, 4c, 4d, 5b) all connections are toggled with respect to the top and bottom switching elements 60, 61.

The diagrams shown in FIGS. 6 to 11 refer to the three configurations shown in FIGS. 3, 4 and 5. They all show a power factor of about 0.95 and a load of 10 W. In an embodiment, in which the load 22 is an LED string comprising two or more LEDs, the output (drive) current io is composed of a DC component iLED through the LED string plus a HF current flowing through a parallel HF capacitor (not shown here; indicated as C_HF in FIG. 14b). In the examples, the LED current is kept constant by manipulating the duty cycle.

Figure 3A:
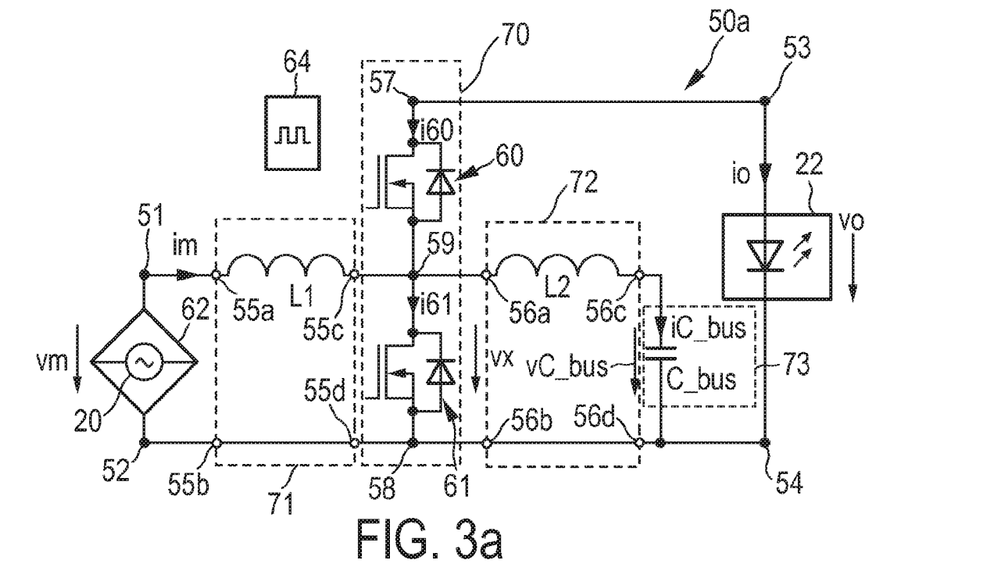
FIG. 3 shows schematic block diagrams of two embodiments of a first configuration of a driver device according to the present invention.

A first embodiment of a driver device 50a according to the present invention is schematically shown in FIG. 3a. It comprises power input terminals 51, 52 for receiving a rectified supply voltage vm from an external power supply 20 (e.g. a mains voltage supply), which is preferably rectified by a rectifier 62. The driver device 50a further comprises power output terminals 53, 54 for providing a drive voltage vo and/or a drive current io for driving a load 22.

A half-bridge unit 70 (also called switching unit or half-bridge) comprising a first 60 and a second 61 switching element is coupled in series between a high-voltage node 57 and a low-voltage node 58 and forms a switch node 59 between said first and said second switching element 60, 61. A boost input filter unit 71 comprising a first inductor L1 is coupled between said power input terminals 51, 52 and said half-bridge unit 70. A buck output filter unit 72 comprising a second inductor L2 is coupled between said half-bridge unit 70 and a power output terminal 53, 54.

The input terminals 55a, 55b of the boost input filter unit 71 are coupled to the power input terminals 51, 52. The output terminals 55c, 55d of the boost input filter unit 71 are coupled to the switch node 59 and the low-voltage node 58 of the half-bridge unit 70. The input terminals 56a, 56b of the buck output filter unit 72 are coupled to the low-voltage node 58 and the switch node 59 of the half-bridge unit 70. The output terminals 56c, 56d of the buck output filter unit 72 are coupled to an energy storage unit 73, which is preferably a single bus capacitor C_bus.

The power output terminals 53, 54, between which the load 22 is coupled, are directly coupled to the high-voltage node 57 and the low-voltage node 58 of the half-bridge unit 70.

Finally, a control unit 64 (implemented e.g. as a controller, processor or computer that is appropriately designed or programmed) is provided for controlling said switching elements 60, 61.

Figure 3B:
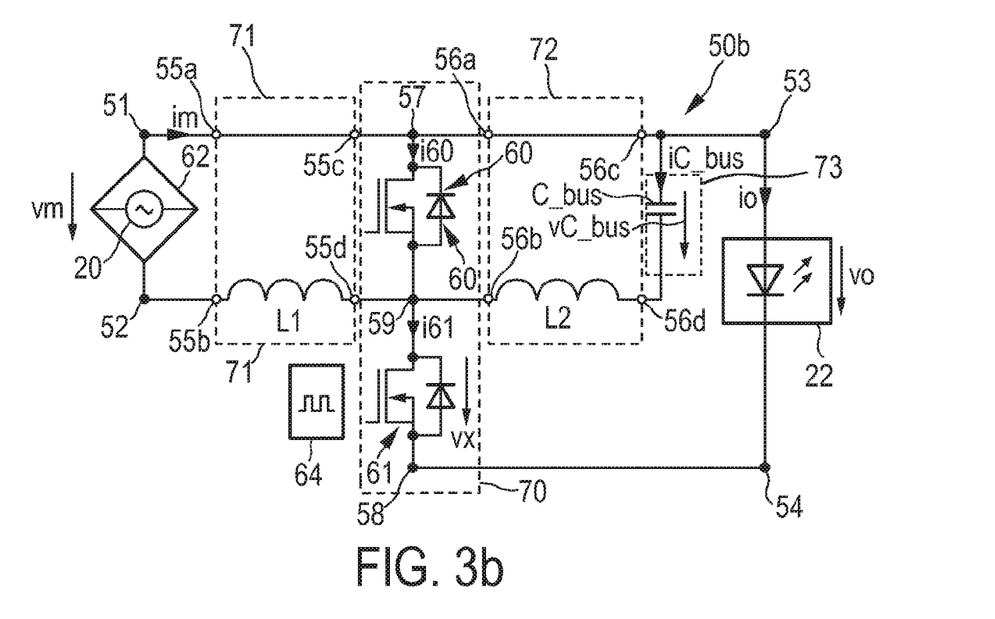

A second embodiment of a driver device 50b according to the present invention is schematically shown in FIG. 3b. Compared to the first embodiment of the driver device 50a, the output terminals 55c, 55d of the boost input filter unit 71 are coupled to the high-voltage node 57 and the switch node 59 of the half-bridge unit 70. Further, the input terminals 56a, 56b of the buck output filter unit 72 are coupled to the switch node 57 and the high-voltage node 57 of the half-bridge unit 70.

FIG. 12 shows four embodiments of the boost input filter unit 71. In the first and second embodiments 71a, 71b, a single first inductor L1 is provided, either in the connection from the first input terminal 55a to the first output terminal 55c or in the connection between the second input terminal 55b and the second output terminal 55d. In the third and fourth embodiments 71c, 71d, a diode D1 is coupled in series to the first inductor L1.

Figure 13A:
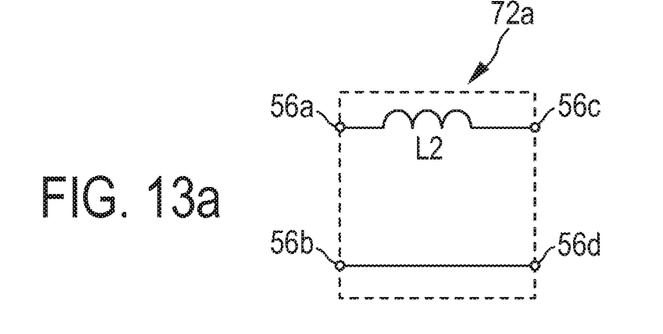
FIG. 13 shows two variations of a buck output filter unit for use in the driver device according to the present invention.
Figure 13B:
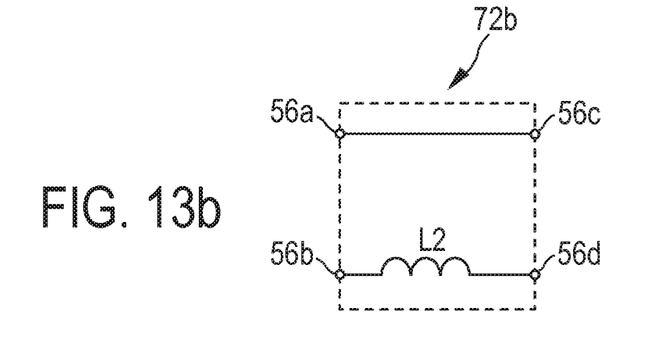

FIG. 13 shows two embodiments of the buck output filter unit 72. In the first embodiment 72a, the second inductor L1 is provided in the connection from the first input terminal 56a to the first output terminal 56c, while in the second embodiment 72b the second inductor L2 is provided in the connection between the second input terminal 56b and the second output terminal 56d.

The various embodiments of the boost input filter unit 71 shown in FIG. 12 and the various embodiments of the buck output filter unit 72 shown in FIG. 13 can be coupled into the various embodiments of the driver unit as shown in FIG. 3 (and also into the embodiments shown in FIGS. 4 and 5) instead of the respective embodiments of the boost input filter unit 71 of the buck output filter unit 72 shown in those figures.

Figure 14A:
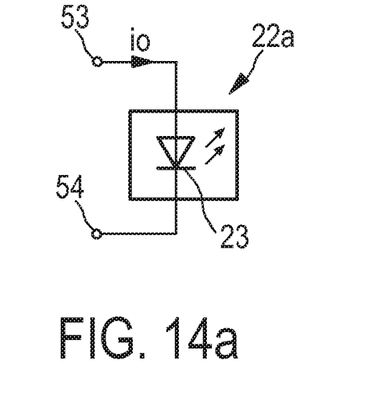
FIG. 14 shows two exemplary embodiments of a load that can be driven by a driver device according to the present invention.
Figure 14B:
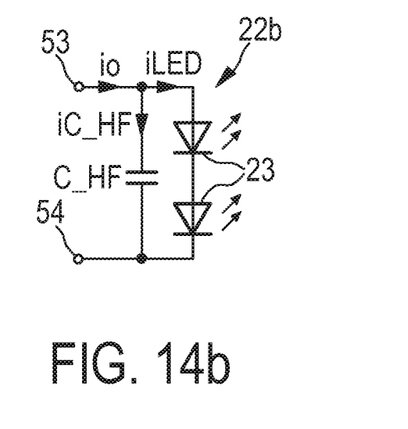

Two embodiments of a load that can be coupled to the driver device according to the present invention are shown in FIG. 14. FIG. 14a shows a single LED 23 as load 22a, while FIG. 14b shows a load 22b formed by a series coupling of several LEDs 23 coupled in parallel to a HF capacitor C_HF. In the load 22b the load current io is split into the capacitor current iC_HF and the LED current iLED.

The diode D1 is used if an input HF filter capacitor (i.e. a mains filter) is connected at the boost input terminals 55a, 55b, i.e. between the power input terminals 51, 52. The diode D1 is omitted if a HF filter capacitor is connected at the AC input of rectifier 20 and if fast enough rectifiers are used therein. Except for the above restriction (i.e. the D1 is omitted), a HF capacitor may be connected to each of the three terminals, namely the power input terminals 51, 52, the boost input filter output terminals 55c, 55d, and the buck output filter output terminals 56c, 56d.

According to the first and second embodiments, the boost converter, formed essentially by the first inductor L1 and the two switching elements 60, 61, supplies the load 22. The boost converter's current iLED (which corresponds to the output current io in the case of a load as shown in FIG. 14a) can be kept constant throughout the mains cycle because part of the mains input current im is fed to the bus capacitor C_bus that is linked to the end of the buck converter, formed essentially by the switching elements 60, 61 and the second inductor L2, operating as a bidirectional converter, which supplies the load 22 at low mains input voltages.

Figure 6:
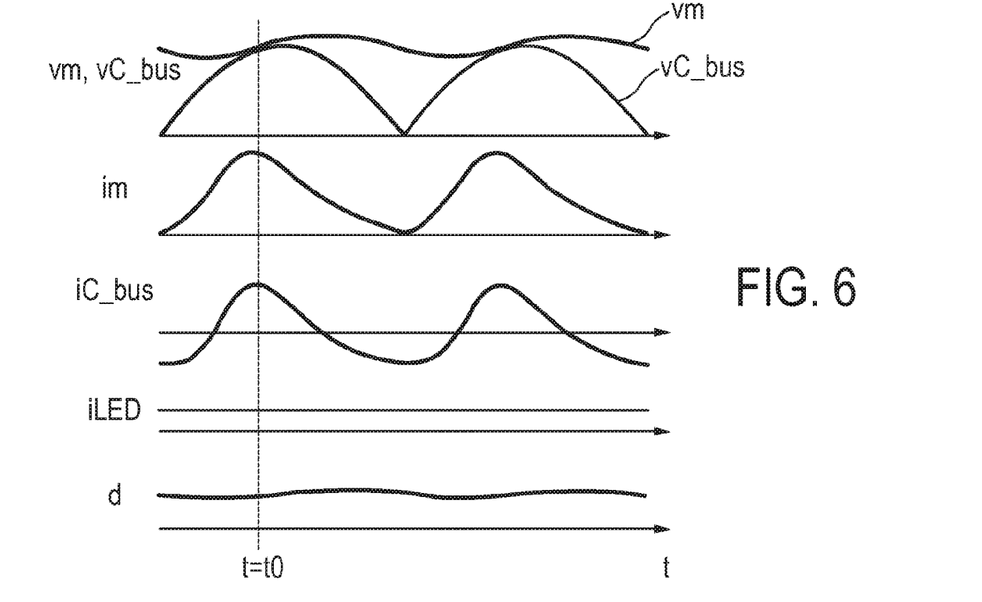
FIG. 6 shows diagrams of voltages and currents during one low-frequency cycle in an embodiment of the first configuration of the proposed driver device.
Figure 7:
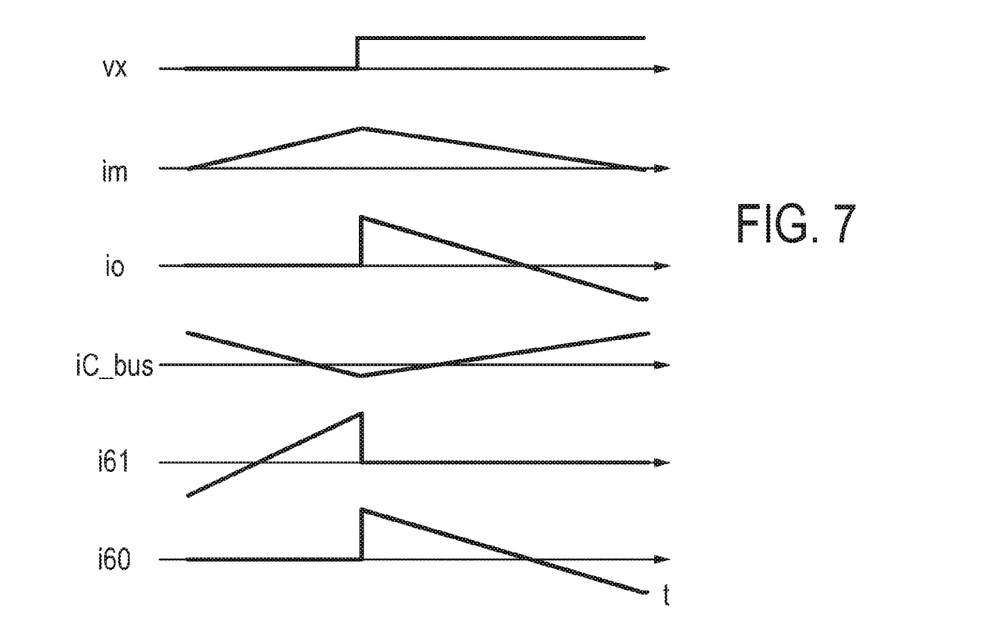
FIG. 7 shows diagrams of various currents during one high-frequency cycle in an embodiment of the first configuration of the proposed driver device.

FIGS. 6 and 7 show signal diagrams of a 120V, 60 Hz application (i.e. vm(rms)=120V, fm=60 Hz) of the first embodiment with a LED string voltage vo=250V at 40 mA (of iLED) for an embodiment of a driver device 50a as shown in FIG. 3a during one mains cycle. Signal iC_bus, here LF bus cap current iC_bus in FIG. 6, illustrates the bidirectional operation of the buck converter during a mains cycle (FIG. 6) and how the buck converter supports ZVS at half-bridge turn off (FIG. 3), here HF inductor current (=bus cap current) iC_bus in FIG. 7, i.e. if the switching element 60 is turned off and switching element 61 is turned on (as indicated by signals i60, i61). For the example of the waveforms shown in FIGS. 6 and 7, the following further values apply: P=10 W, PF=0.95, vbus(max)=185V, C_bus=4.7 µF. The duty cycle is indicated by means of d.

Figure 4A:
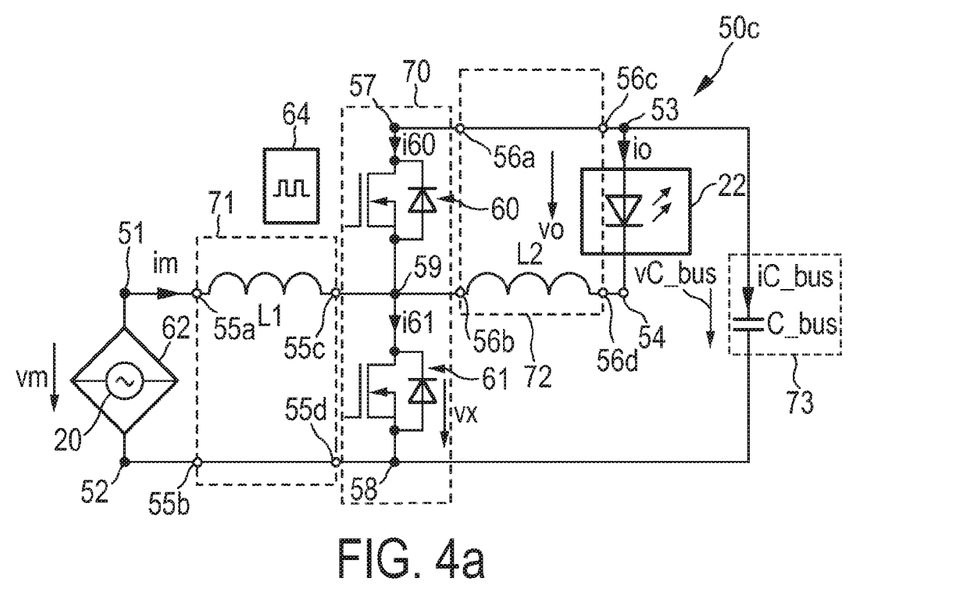
FIG. 4 shows schematic block diagrams of four embodiments of a second configuration of a driver device according to the present invention.

A third embodiment of a driver device 50c according to the present invention is schematically shown in FIG. 4a. This embodiment is substantially identical to the embodiment of the driver device 50a, with the exception that in this embodiment the output terminals 55c, 55d of the boost input filter unit 71 are coupled to the low-voltage node 58 and switch node 59 of the half-bridge unit 70. The input terminals 56a, 56b of the buck output filter unit 72 are coupled to the switch node 59 and the high-voltage node 57 of the half-bridge unit 70. The energy storage unit 73 is coupled between the high-voltage node 57 and the low-voltage node 58 of the half-bridge unit 70. Further, the power output terminals 53, 54, and thus also the load 22, are directly coupled to output terminals 56c, 56d of said buck output filter unit 72.

Figure 4B:
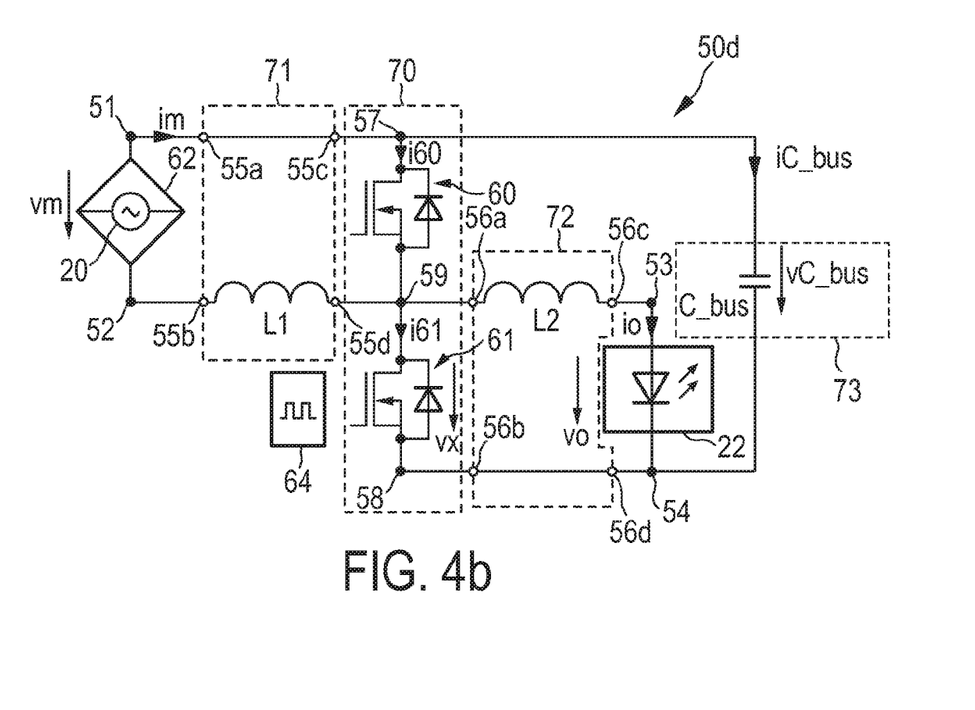

A fourth embodiment of a driver device 50d according to the present invention is schematically shown in FIG. 4b. Compared to the third embodiment of the driver device 50c in this embodiment, like in the embodiment of the driver device 50b, the output terminals 55c, 55d of the boost input filter unit 71 are coupled to the high-voltage node 57 and the switch node 59 of the half-bridge unit 70. Further, the input terminals 56a, 56b of the buck output filter unit 72 are coupled to the switch node 57 and the low-voltage node 58 of the half-bridge unit 70.

Figure 4C:
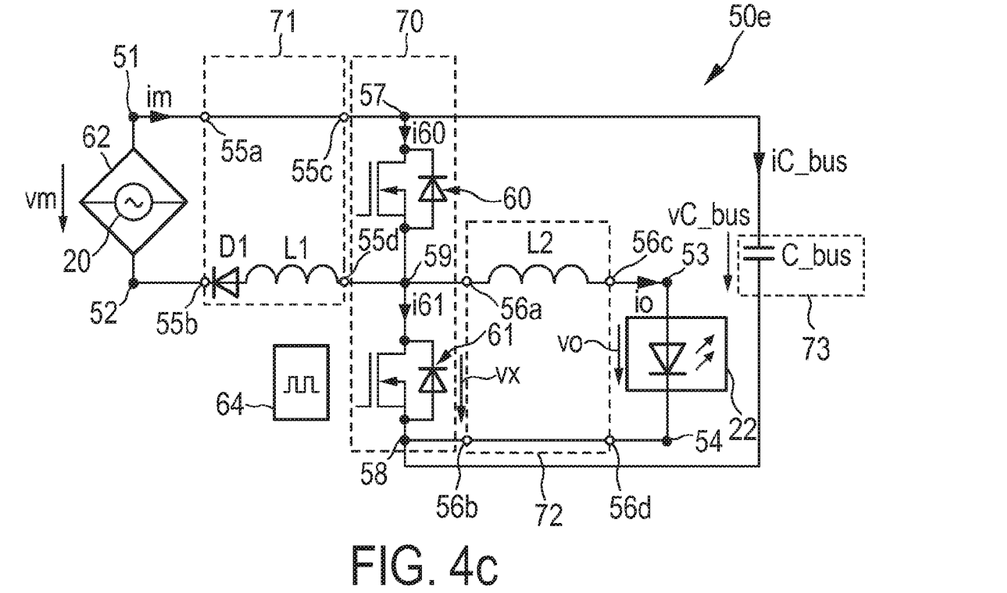
Figure 4D:
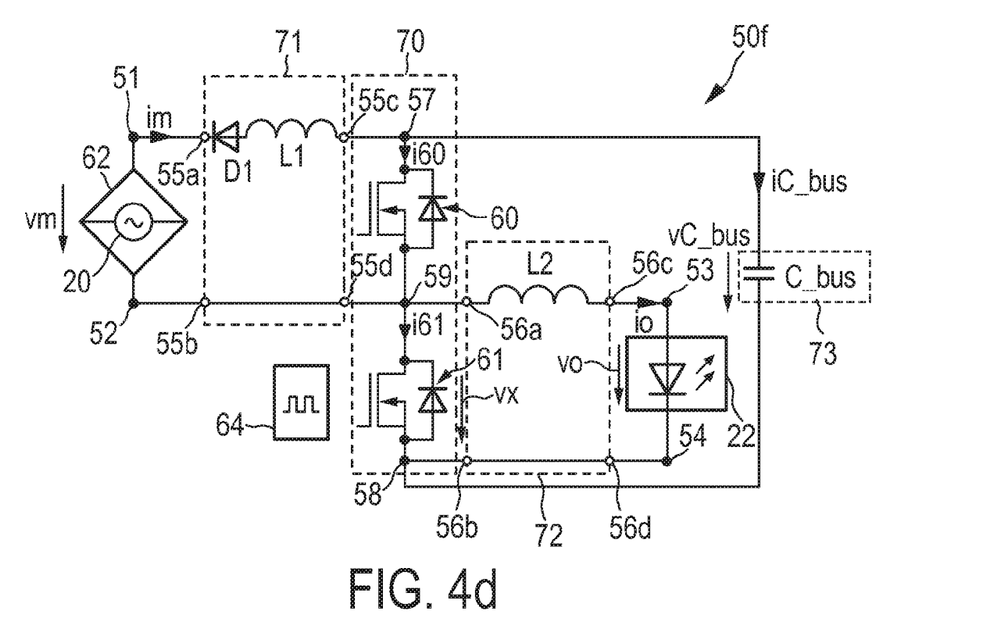

FIGS. 4c and 4d show a fifth and a sixth embodiment of the driver device 50e, 50f. The embodiment shown in FIG. 4c is identical to the embodiment shown in FIG. 4b, but an additional diode D1 is provided in series to the first inductor L1. In the embodiment shown in FIG. 4c, the diode D1 and the first inductor L1 are provided in the connection between the first input terminal 55a and the first output terminal 55c.

According to the third to sixth embodiment, the boost converter supplies the bus capacitor C_bus. The buck converter supplies the load 22. For self-stabilizing operation, the buck converter is inverted with respect to the boost converter. Again, the load current iLED can be kept constant throughout the mains cycle because part of the mains input current im is fed to bus capacitor C_bus that supplies the load 22 at low mains input voltages.

Figure 8:
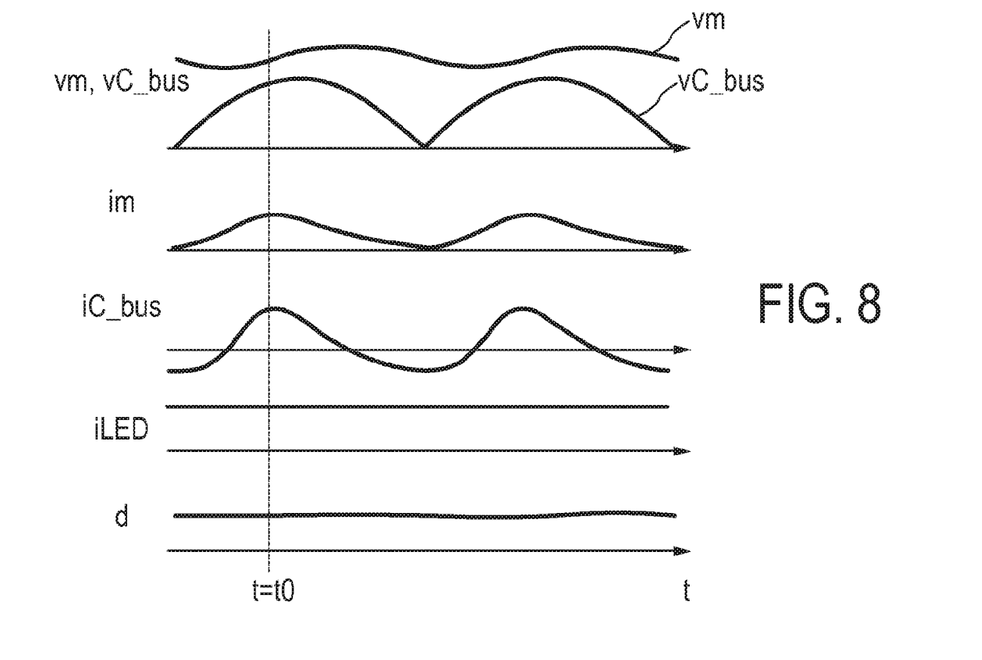
FIG. 8 shows diagrams of voltages and currents during one low-frequency cycle in an embodiment of the second configuration of the proposed driver device.
Figure 9:
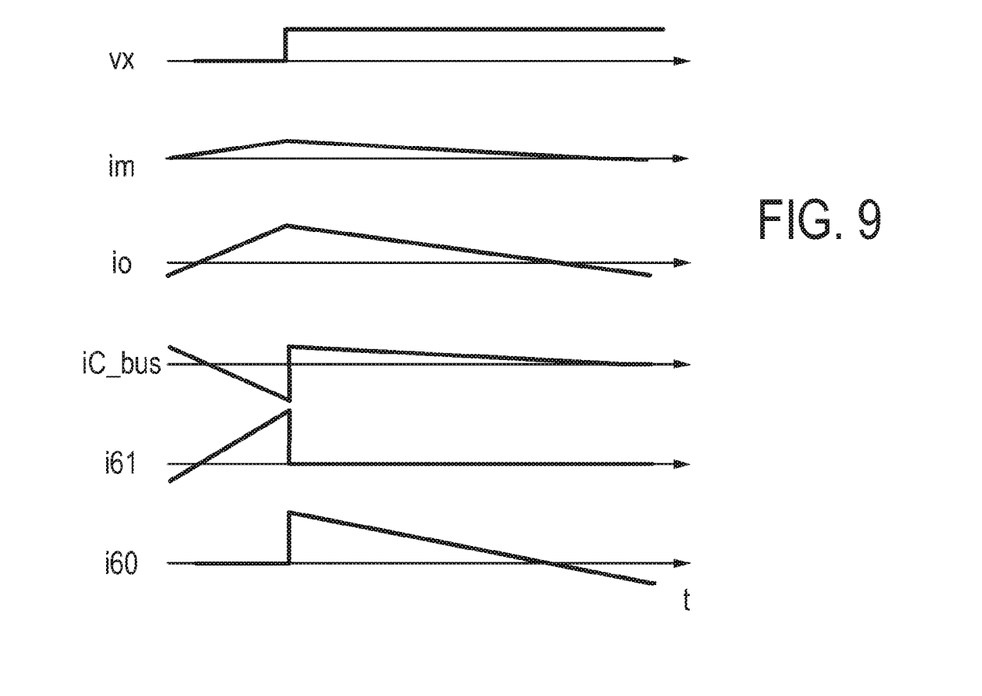
FIG. 9 shows diagrams of various currents during one high-frequency cycle in an embodiment of the second configuration of the proposed driver device.

FIGS. 8 and 9 show signal diagrams in a 230V, 50 Hz application (i.e. vm(rms)=230V, fm=50 Hz) of the third embodiment with a LED string voltage of 100V at 100 mA. Signal iC_bus illustrates the bidirectional operation of the boost converter during a mains cycle (FIG. 7) and again how the buck converter supports ZVS at turn off (signal io in FIG. 8). For the example of the waveforms shown in FIGS. 8 and 9, the following further values apply: P=10 W, PF=0.95, vbus(max)=475V, C_bus=1 µF. This configuration shows the lowest RMS currents.

Figure 5A:
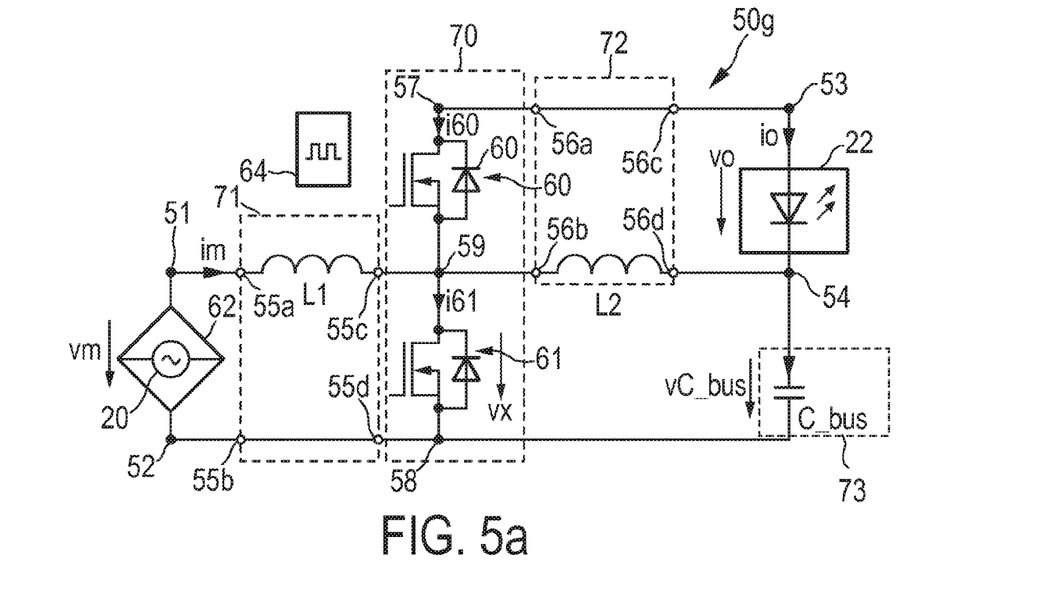
FIG. 5 shows schematic block diagrams of two embodiment of a third configuration of a driver device according to the present invention.

A seventh embodiment of a driver device 50g according to the present invention is schematically shown in FIG. 5a. This embodiment is substantially identical to the embodiment of the driver device 50c, but in this embodiment the energy storage unit 73 is coupled in series with the load 22, i.e. between the power output terminal 54 and the low-voltage terminal 58 of the half-bridge unit 70.

Figure 5B:
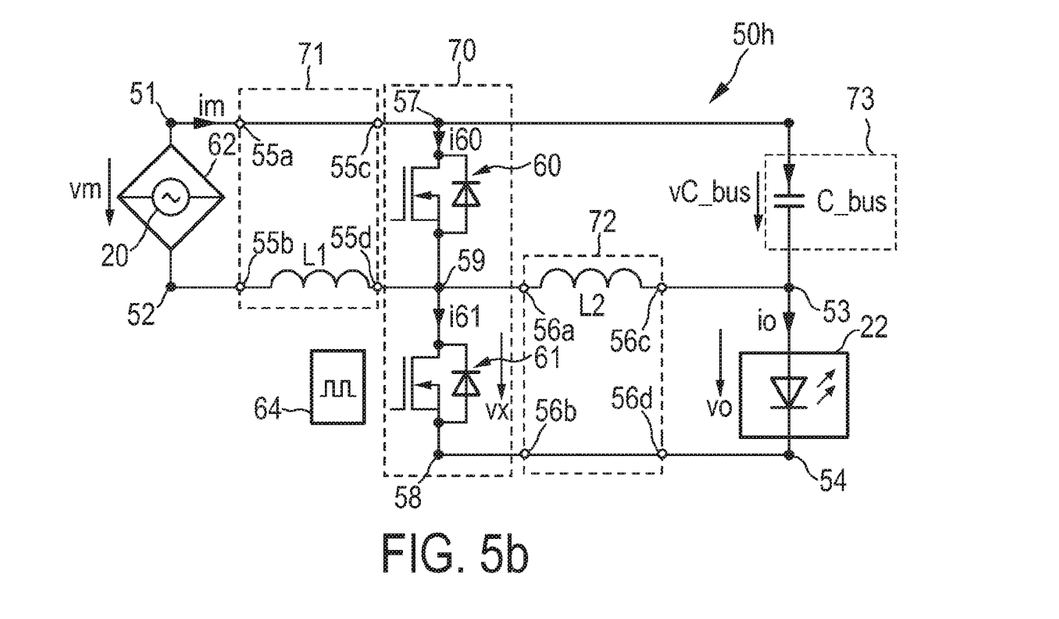

An eighth embodiment of a driver device 50$h$ according to the present invention is schematically shown in FIG. 5$b$. Compared to the seventh embodiment of the driver device 50$g$, in this embodiment the load 22 and the energy storage unit 70 are exchanged, i.e. the load 22 is coupled between the power output terminal 54 and the low-voltage terminal 58 of the half-bridge unit 70 and the energy storage unit 70 is coupled between the high-voltage terminal 57 of the half-bridge unit 70 and the power output terminal 53.

In particular implementations of the seventh and eighth embodiments, the bus capacitor C_bus and the LED string 22 are stacked. For self-stabilizing operation, the LED string 22 is connected to the switching element opposite to the one the boost converter is connected to. Again, the load current iLED can be kept constant throughout the mains cycle because part of the mains input power is fed to the bus capacitor that supplies the load at low mains input voltages.

Figure 10:
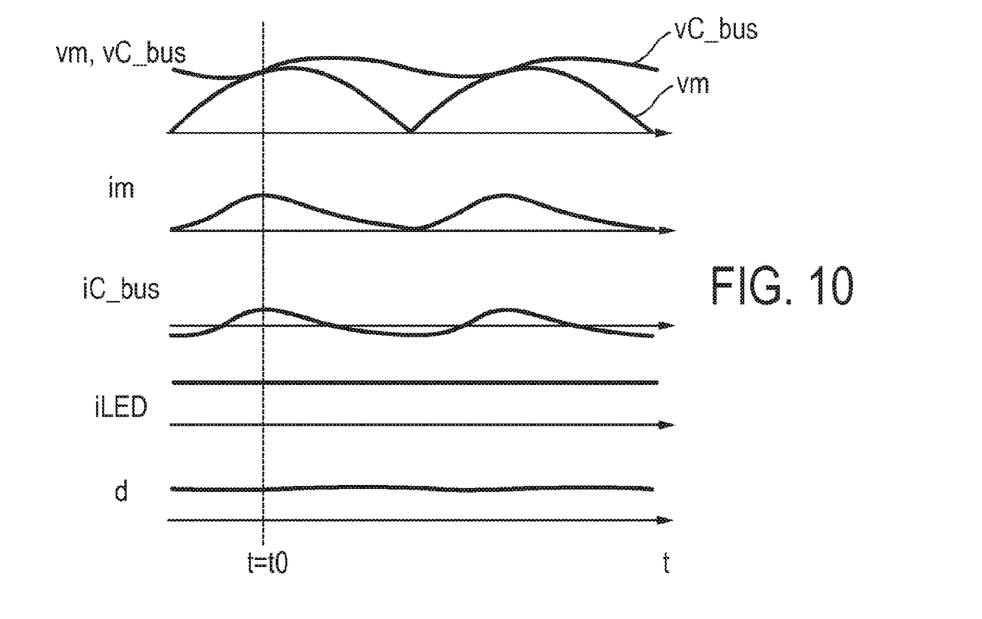
FIG. 10 shows diagrams of voltages and currents during one low-frequency cycle in an embodiment of the third configuration of the proposed driver device.
Figure 11:
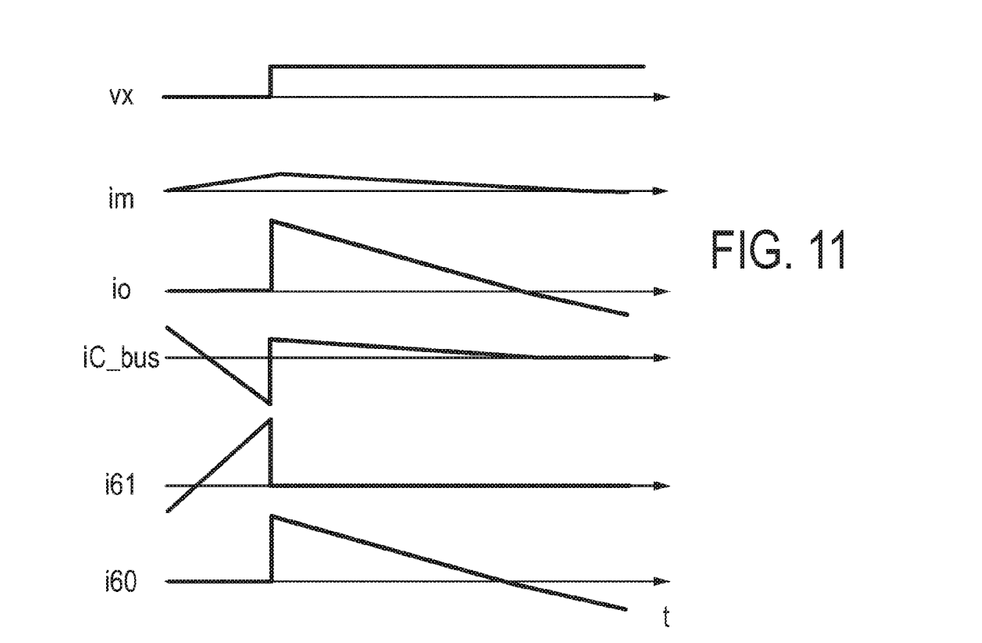
FIG. 11 shows diagrams of various currents during one high-frequency cycle in an embodiment of the third configuration of the proposed driver device.
Figure 12A:
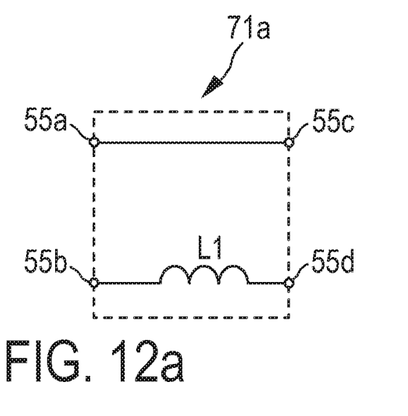
FIG. 12 shows four variations of a boost input filter unit for use in the driver device according to the present invention.
Figure 12B:
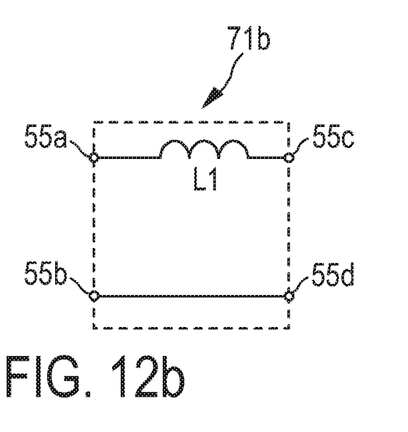
Figure 12C:
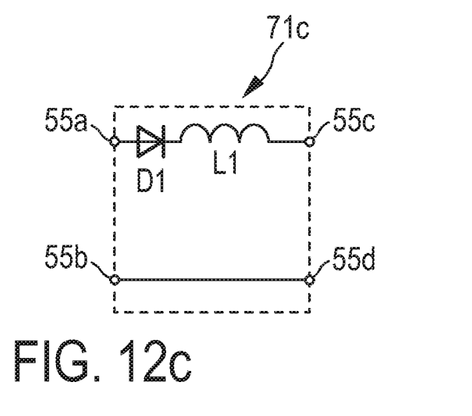
Figure 12D:
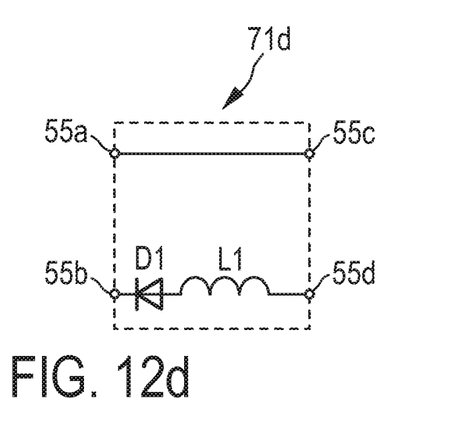

FIGS. 10 and 11 show signal diagrams in a 230V, 50 Hz application (i.e. vm(rms)=230V, fm=50 Hz) of the seventh embodiment with a LED string voltage of 100V at 100 mA. Signal iC_bus illustrates the bidirectional operation of the boost converter during a mains cycle (FIG. 10) and again how the buck converter 11 supports ZVS at half-bridge turn off (signal io in FIG. 7). For the example of the waveforms shown in FIGS. 10 and 11, the following further values apply: vo=100V, P=10 W, PF=0.94, vbus(max)=380V, C_bus=1 µF.

Figure 15:
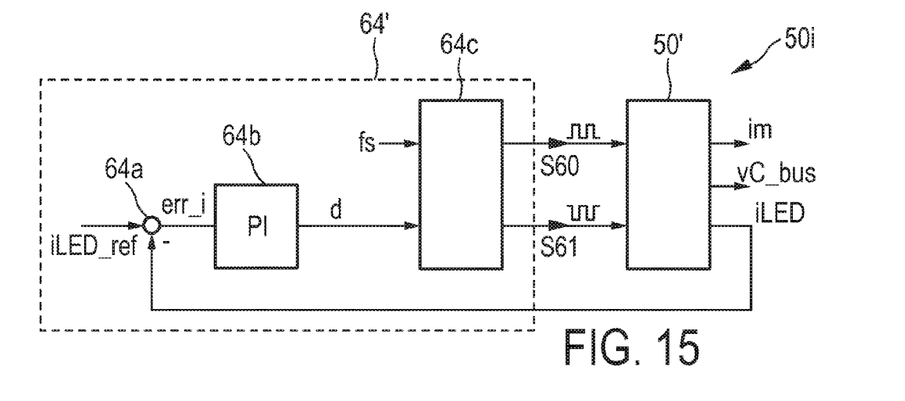
FIG. 15 shows a first embodiment of a control unit of the proposed driver device.

Next, the control method and the device according to the present invention will be explained. FIG. 15 shows another embodiment of a driver device 50$i$ including a first embodiment of the control unit 64' (the other parts of the driver device are schematically indicated by a single block 50'). The LED current iLED (which is the DC component of output current io; cf. FIG. 14$b$) is measured and compared to a (preset or variable) reference current iLED_ref in a comparison element 64$a$. The control error err_i is processed in a controller block 64$b$ (indicated by PI) resulting in the duty cycle d as manipulating variable. Together with preset switching frequency fs, gate driving signals, representing the control signals S60, S61 for both switching elements 60, 61, are formed in a (gate) driver block 64$c$.

Figure 16:
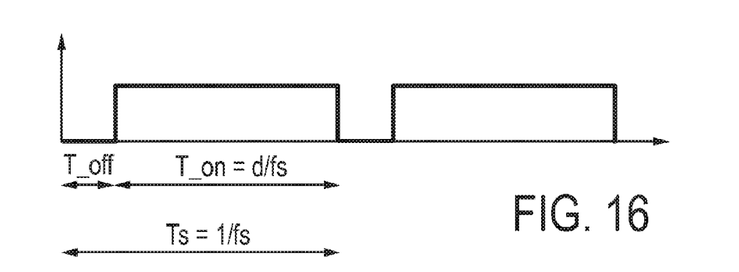
FIG. 16 shows the switching signal of a first switching element of the half-bridge unit.

FIG. 16 shows a timing diagram for the (gate of the) the switching element 60.

The duty cycle is basically related to the control error as typically generated in a buck converter. Regarding the embodiments of the driver device 50$d$, a positive control error err_i (too little current) causes an increase of d and vice versa.

Self-stabilizing behavior is achieved by the arrangement of the boost input filter unit with respect to the terminals of the buck output filter unit. If e.g. on average more power is drawn from the input than from the output, the bus voltage will increase, which will cause the control to decrease d, which in turn will reduce the input power. In the same manner, the other embodiments can be operated, wherein the meaning of the duty cycle is toggled, i.e. d is to be replaced by 1−d for the embodiments of the driver device 50$b$, 50$d$, 50$e$, 50$f$, 50$h$ compared to the embodiment of the driver device 50$a$, 50$c$, 50$g$. Other operation characteristics such as the bus voltage and mains current (PF) are generally not explicitly controlled. They result from design and operation choices and tolerances.

In a further embodiment, the maximum bus voltage is also explicitly controlled by means of the control, in particular by manipulating also the switching frequency. While d is still manipulated to control the output current, fs is increased in response to an increasing bus voltage (as a result e.g. of a high mains voltage or a high output voltage). Alternatively, it is also possible to separately control T_on and T_off, which however will result in a similar switching pattern.

To avoid too high bus voltages (i.e. to avoid over boosting) in the case that the reference signal iLED_ref is variable and reduced far below its rated maximum value, in a further embodiment the control enters a burst mode, i.e. switches off the converter periodically at a burst frequency fs_brst below fs (e.g. 10 to 1000 times). Furthermore, and alternatively to frequency modulation for bus voltage control, fs can be used to shape the input current, either to improve the PF or to better comply with certain kinds of wall plug dimmers.

Figure 17:
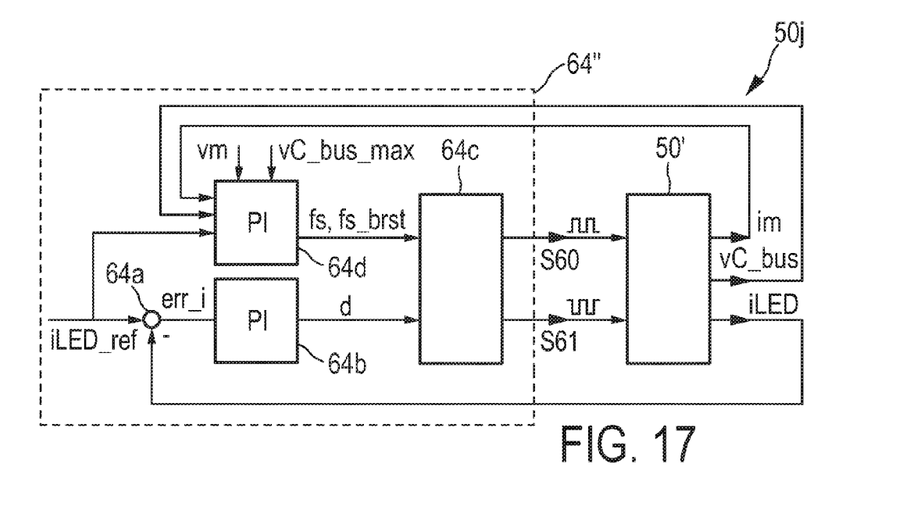
FIG. 17 shows a second embodiment of a control unit of the proposed driver device.

Still another embodiment of a driver device 50$j$ including a second embodiment of the control unit 64" is depicted in FIG. 17. Compared to the embodiment shown in FIG. 15, the control unit 64" additionally comprises a second controller block 64$d$ (indicated by PI) resulting in the switching frequency fs and fs_brst as manipulating variable provided to the (gate) driver block 64$c$. The second controller block 64$d$ receives as input the reference current iLED_ref, the bus voltage vC_bus, the input current im, the input voltage vm and the maximum bus voltage vC_bus_max.

According to the present invention, a driver device and a corresponding method are proposed according to which an offline synchronous boost converter is integrated into a synchronous buck converter. The two ends are connected to a load, e.g. an HV LED load, and to a energy storage unit, e.g. a mains filter capacitor, which gives both constant LED current and power factors of 0.9 or higher. The separate capacitor voltage level allows minimizing the stored energy. The buck converter current provides for lossless half-bridge switching, which means high efficiency even at miniaturized inductors.

There are at least three advantageous configurations of the boost integrated synchronous buck converter (BSB) that can cope with various load and input voltage ranges including universal mains. All of them can be controlled over wide load ranges by means of manipulating the duty cycle only or the switching frequency or by bursting, too.

The embodiments 50$a$, 50$b$ of the driver device are mainly suited for load (LED string) voltages higher than peak supply voltage, e.g. for 120V mains supply and 250V LED strings. The embodiments 50$c$, 50$d$, 50$e$, 50$f$ are mainly suited for load (LED string) voltages much lower than peak supply voltage, e.g. for 120V or 230V mains and LED string voltages of 10 to 150V. These embodiments show low root mean square (rms) currents in filters and half-bridge units. The embodiments 50$g$, 50$h$ are mainly suited for applications like embodiments 50$c$-50$f$. These embodiments show reduced voltage stress on bus capacitors at somewhat increased rms currents in filters and half-bridge units.

The advantage of the embodiments of the first type (i.e. the embodiment 50$a$, 50$c$, 50$g$) is that the supply voltage is ground referenced, which makes measuring vm and im a bit easier. The advantage of the embodiments of the second type (i.e. the embodiments 50$b$, 50$d$, 50$e$, 50$f$, 50$h$) is that the load is ground referenced, which sometimes helps measuring the current io and which might simplify isolation of possible heat sinks.

In preferred embodiments, a single ZVS half-bridge converter and two chokes (i.e. a boost and a buck converter) are provided. The switch node is preferably connected to rectified mains via a boost inductor. The two ends (of the buck and the boost converter) are connected to the load and the mains (bus) capacitor or a stack thereof. When the capacitor is powered, the buck converter is connected via the same switch as the boost converter. When the LED is powered, connections are altered. Either only the LED current is controlled so as to be constant (e.g. by duty cycle) or both the LED current and the bus voltage are controlled in two loops, causing the frequency to be manipulated too.

The present invention is preferably applied in consumer and "prosumer" (professional consumer) drivers, in particular as LED drivers, above 2 W, e.g. either integrated into a luminaire or arranged externally for HV LEDs. Further applications are non-mains isolated professional drivers with relaxed THD requirement (e.g. 20%) and HV LED string loads.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. Driver device for driving a load, in particular an LED unit comprising one or more LEDs, said driver device comprising:
   power input terminals for receiving a rectified supply voltage from an external power supply,
   power output terminals for providing a drive voltage and/or current for driving the load,
   a single half-bridge switching unit comprising a first and a second switching element, coupled in series between a high-voltage node and a low-voltage node and having a switch node between said first and said second switching element,
   a boost input filter unit comprising a first inductor coupled between said power input terminals and said half-bridge switching unit,
   a buck output filter unit comprising a second inductor coupled between said half-bridge switching unit and at least one of the power output terminals, and
   a control unit for controlling said switching elements,
   wherein
   the power output terminals are directly coupled to the high-voltage node and the low-voltage node of the half-bridge switching unit, wherein the power output terminals are coupleable to at least one LED, wherein the power output terminals are also configured to drive the at least one LED when the at least one LED is coupled to the power output terminals.

2. Driver device as claimed in claim 1, wherein output terminals of said boost input filter unit are coupled to the switch node and the low-voltage node of the half-bridge switching unit.

3. Driver device as claimed in claim 2, wherein input terminals of said buck output filter unit are coupled to the high-voltage node and the switch node of the half-bridge switching unit.

4. Driver device as claimed in claim 1, wherein output terminals of said boost input filter unit are coupled to the high-voltage node and the switch node of the half-bridge switching unit.

5. Driver device as claimed in claim 4, wherein input terminals of said buck output filter unit are coupled to the switch node and the low-voltage node of the half-bridge switching unit.

6. Driver device as claimed in claim 1, further comprising:
   an energy storage unit, wherein the energy storage unit is coupled between the high-voltage node and the low-voltage node of the half-bridge switching unit.

7. Driver device as claimed in claim 6,
   wherein the power output terminals are directly coupled to output terminals of said buck output filter unit.

8. Driver device as claimed in claim 1, wherein the energy storage unit is coupled between the high-voltage node or the low-voltage node of the half-bridge switching unit and an output terminal of the buck output filter unit.

9. Driver device as claimed in claim 8, wherein the power output terminals are directly coupled to the high-voltage node or the low-voltage node of the half-bridge switching unit and an output terminal of the buck output filter unit.

10. Driver device as claimed in claim 1,
    further comprising a rectifying unit for rectifying an AC supply voltage, to said rectified periodic supply voltage.

11. Driver device as claimed in claim 1,
    wherein the boost input filter unit comprises a diode in series to the first inductor.

12. Driver device as claimed in claim 1,
    wherein the control unit is adapted for keeping the output current constant so as to keep the voltage across the energy storage element below a predetermined threshold and/or shape the input current.

13. A light apparatus comprising:
    a light assembly comprising one or more light units, in particular an LED unit comprising one or more LEDs, and
    the driver device for driving said light assembly as claimed in claim 12.

14. Driver device as claimed in claim 1, wherein the power output terminals and the energy storage unit are in series between the high-voltage node and the low-voltage node of the half-bridge switching unit.

* * * * *